(12) United States Patent
Dreps et al.

(10) Patent No.: US 6,654,897 B1
(45) Date of Patent: Nov. 25, 2003

(54) DYNAMIC WAVE-PIPELINED INTERFACE APPARATUS AND METHODS THEREFOR

(75) Inventors: Daniel Mark Dreps, Georgetown, TX (US); Frank David Ferraiolo, Essex, VT (US); Kevin Charles Gower, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/263,662

(22) Filed: Mar. 5, 1999

(51) Int. Cl.[7] ............... G06F 1/12; G06F 1/04; H04L 7/00
(52) U.S. Cl. .............. 713/401; 713/400; 713/500; 713/502; 713/503; 713/600
(58) Field of Search ............... 713/400, 401, 713/500, 502, 503, 600

(56) References Cited

U.S. PATENT DOCUMENTS

| | | | | |
|---|---|---|---|---|
| 4,748,623 A | * | 5/1988 | Fujimoto | 370/513 |
| 4,922,141 A | * | 5/1990 | Lofgren et al. | 327/158 |
| 4,965,884 A | * | 10/1990 | Okura et al. | 375/354 |
| 4,993,026 A | * | 2/1991 | Yamashita | 370/540 |
| 5,086,500 A | * | 2/1992 | Greub | 4/231.8 |
| 5,258,660 A | | 11/1993 | Nelson et al. | 307/603 |
| 5,442,636 A | * | 8/1995 | Bontekoe | 370/509 |
| 5,467,464 A | * | 11/1995 | Oprescu et al. | 713/400 |
| 5,507,029 A | * | 4/1996 | Granato et al. | 395/500 |
| 5,535,379 A | * | 7/1996 | Koura | 713/502 |
| 5,621,774 A | * | 4/1997 | Ishibashi et al. | 375/371 |
| 5,778,214 A | * | 7/1998 | Taya et al. | 713/400 |
| 5,838,936 A | | 11/1998 | Chau et al. | 395/309 |
| 5,867,541 A | | 2/1999 | Tanaka et al. | 375/354 |
| 5,872,959 A | * | 2/1999 | Nguyen et al. | 713/401 |
| 5,990,927 A | * | 11/1999 | Hendricks et al. | 725/132 |
| 6,032,282 A | * | 2/2000 | Masuda et al. | 714/744 |
| 6,144,242 A | * | 11/2000 | Jeong et al. | 327/269 |
| 6,167,528 A | * | 12/2000 | Arcoleo | 713/501 |
| 6,226,768 B1 | * | 5/2001 | Chujo et al. | 714/746 |
| 6,229,367 B1 | * | 5/2001 | Choudhury | 327/276 |
| 6,247,138 B1 | * | 6/2001 | Tamura et al. | 713/600 |
| 6,269,451 B1 | * | 7/2001 | Mullarkey | 713/401 |
| 6,289,468 B1 | * | 9/2001 | Godfrey | 713/401 |

OTHER PUBLICATIONS

Wei–han Lien et al., "Wave–Domino Logic: Theory and Applications," *IEEE Transactions on Circuits and Systems II: Analog and Digital Signal Processing*, vol. 42, No. 2, Feb. 1995, pp. 78–91.

M. Potkonjak, "Behavioral Optimization using the Manipulation of Timing Constraints," Retrieved from the Internet at URL:ftp//ftp.cs.ucla.edu/tech–report/95–reports/950057.ps.Z, retrieved on Jul. 5, 2000, 30 pp.

* cited by examiner

*Primary Examiner*—Jeffrey Gaffin
*Assistant Examiner*—Tanh Q. Nguyen
(74) *Attorney, Agent, or Firm*—Barry S. Newberger; Winstead Sechrest & Minick P.C.; Casimer K. Salys

(57) ABSTRACT

An apparatus and method for a dynamic wave-pipelined interface are implemented. Data signals received from a sending circuit delayed via a programmable delay device corresponding to each signal before being latched into the receiving device. The programmable delay in each delay device is set according to an initialization procedure whereby each signal is deskewed to a latest arriving signal. Additionally, a phase of an input/output (I/O) clock controlling the latching of the data signals is adjusted so that a latching transition is substantially centered in a data valid window.

10 Claims, 10 Drawing Sheets

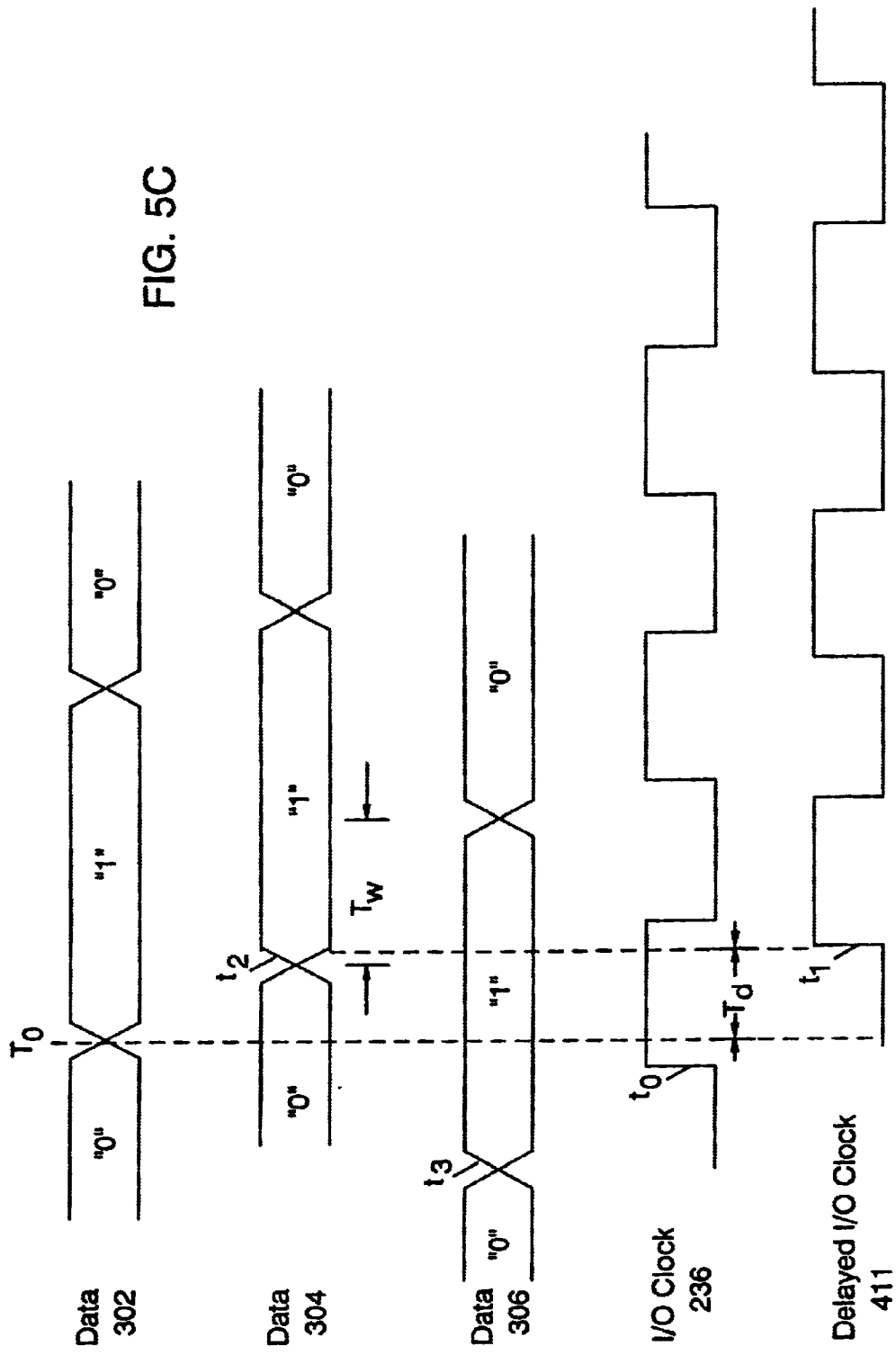

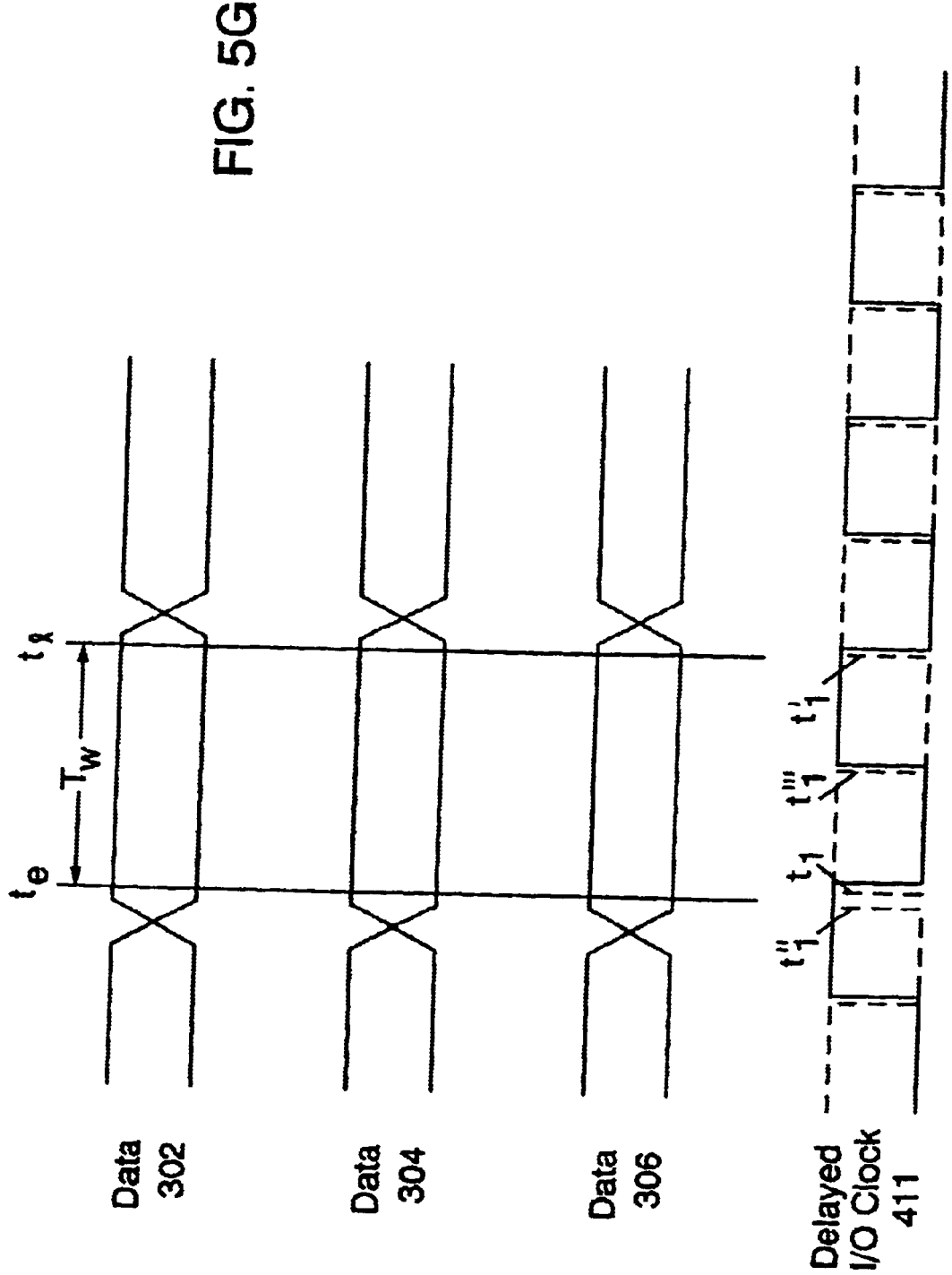

DYNAMIC WAVE-PIPELINED INTERFACE APPARATUS AND METHODS THEREFOR

CROSS-REFERENCE TO RELATED APPLICATIONS

The present invention is related to the following U.S. Patent Applications which are hereby incorporated herein by reference:

Ser. No. 09/263,661 entitled "An Elastic Interface Apparatus and Method Therefor" now U.S. Pat. No. 6,334,163; and Ser. No. 09/263,671 entitled "Programmable Delay Element" now U.S. Pat. No. 6,421,764.

TECHNICAL FIELD

The present invention relates in general to data processing systems, and in particular, to bus interfaces in data processing systems.

BACKGROUND INFORMATION

As system clock speeds have increased in data processing systems, reflecting an increase in the speed of central processing units, the speed of transfers on buses in the system has had to increase correspondingly. The transfer of data across a bus connecting elements of the data processing system is necessarily limited by the physical separation of the elements. One method which has been developed to transfer data across a bus is wave-pipelining in which a data signal is launched on the bus before the previous data has been captured into a receiving device across the bus. In other words, data is pipelined across the bus interface between elements in a data processing system in essentially an "assembly line" fashion. Once the "pipeline" or "assembly line" is filled, data is delivered at an average rate that exceeds the latency across the interface.

In a typical data processing system, data may be transferred from a source device to a plurality of receiving devices. Different receiving devices will be coupled to the source, or sending, device across bus interfaces having differing electrical lengths, and therefore differing latencies.

Additionally, in a single device receiving a plurality of data signals, each signals may have a different latency. Variations may arise from manufacturing tolerances, design limitations, for example variations in line lengths, and time dependent effects, such as data dependent jitter (inter-symbol interference), clock jitter, and noise.

Moreover, data is expected to be delivered synchronously. That is, data is expected to be delivered on a predetermined cycle of the system clock. If data is delivered earlier or later than expected, errors may occur.

In a wave-pipelined interface, timing analysis is made more complicated because both the fast path and slow path are equally important. The data valid region, that is the time interval during which data can be reliably sampled, is reduced as the difference in time between the fast path and the slow path coupling the source, or sending, device to one or more receiving devices increases. If the difference in time between the fast path and the slow path becomes as large as the period of the bus clock, synchrony will be lost. Moreover, skew in the sampling clock may further reduce the data valid region. As bus interface speeds increase, smaller timing variations between the fast and slow paths are required, and clock skew constraints become more severe. However, the control of clock skew and timing variations may be limited by physical constraints presented by the layout of the data processing system. Therefore, there is a need in the art for methods and apparatus to deskew the data at the receiving device end of the interface, and increase the time during which data can be reliably sampled.

SUMMARY OF THE INVENTION

The aforementioned needs are addressed by the present invention. Accordingly, there is provided, in a first form, a wave-pipelined interface apparatus. The apparatus includes a plurality of delay devices, each device being operable for receiving a corresponding data signal, each delay device having a preselectable delay time, and outputting the data signal after the preselected delay time. Circuitry coupled to the plurality of delay devices is operable for setting each the preselectable delay time, each the preselected delay time being set in response to an arrival time associated with each the data signal.

There is also provided, in a second form, a method of dynamic wave-pipelining in a interface which includes the step of setting an arriving edge of each data signal of a plurality of data signals to correspond to an arriving edge of a latest arriving data signal in the plurality of data signals.

Additionally there is provided, in a third form, a data processing system including a dynamic wave-pipelined interface. The data processing system contains a central processing unit (CPU), and a receiving device coupled to the CPU operable for receiving at least one data signal from the CPU. The receiving device has a data receive unit including a plurality of delay devices, each device being operable for receiving a corresponding data signal, and having a preselectable delay time. Each delay device outputs the data signal after the preselected delay time. The data processing system also contains circuitry coupled to the plurality of delay devices operable for setting each the preselectable delay time, each preselected delay time being set in response to an arrival time associated with each data signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5C schematically illustrates a timing diagram corresponding to the method of FIG. 5B;

FIG. 5G schematically illustrates a timing diagram corresponding to the method of FIG. 5F.

DETAILED DESCRIPTION

Figure 1:
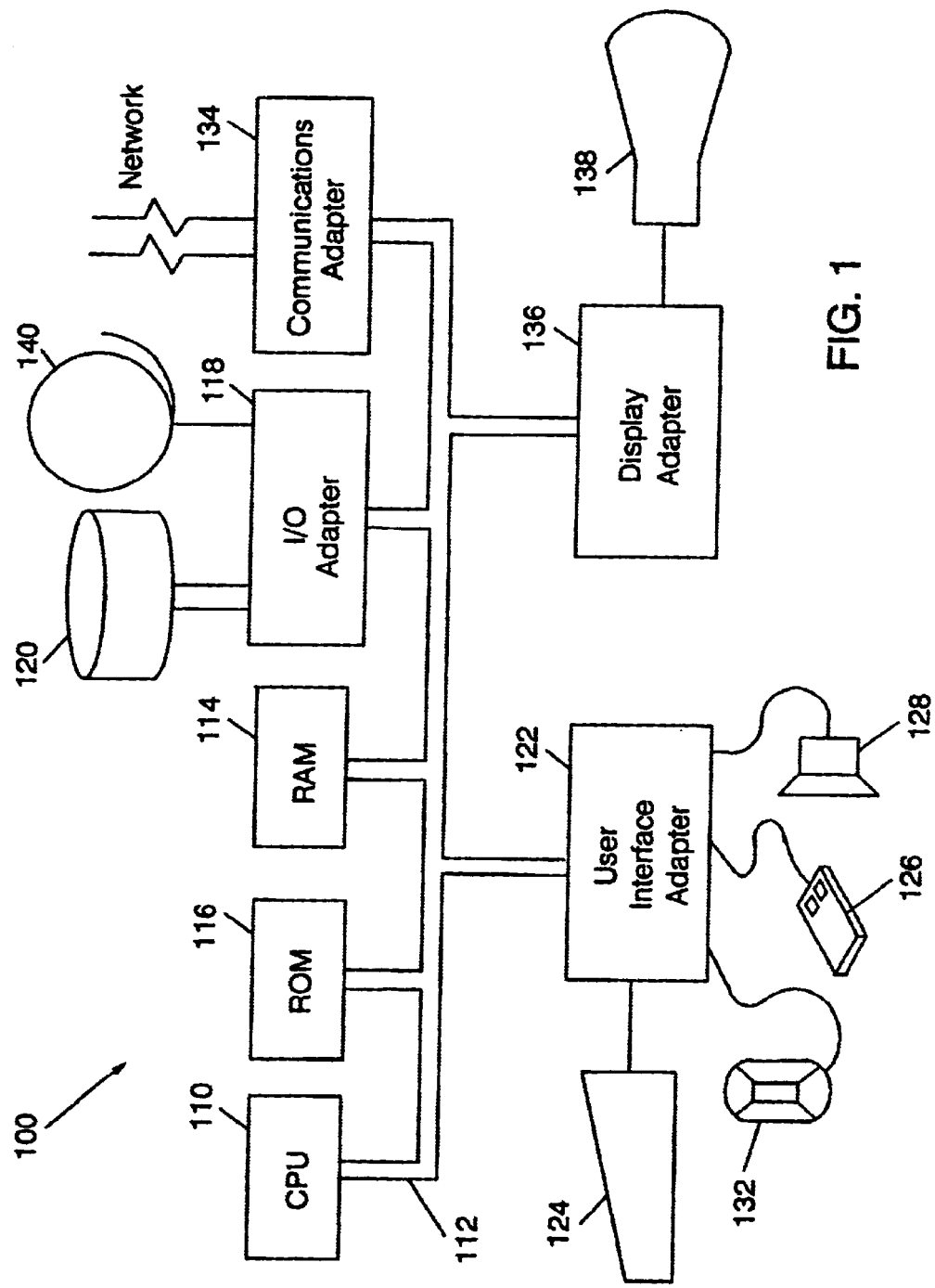
FIG. 1 illustrates, in block diagram form, a data processing system in accordance with an embodiment of the present invention.

The present invention provides a wave-pipelined mechanism that implements mitigation of data timing variations and clock jitter. In an initialization procedure, the size of the data valid region may be increased with a corresponding reduction in the sensitivity of the interface to timing variations between chips on a bus. Timing variations among a plurality of data signals input to the receiving device are removed by determining the earliest and latest arriving data signals, and delaying the earliest arriving data signal by a preselected amount determined by the arrival time difference between the earliest and latest arriving data signals. Additionally, skew in a bus clock from the sending device is removed whereby the latch clock derived therefrom is substantially centered in a data window.

In the following description, numerous specific details are set forth such as bus clock frequencies, clock edges, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to FIGS. 1–5G wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processor 113 in accordance with the subject invention having central processing unit (CPU) 110, such as a conventional microprocessor, and a number of other units interconnected via system bus 112. Data processor 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
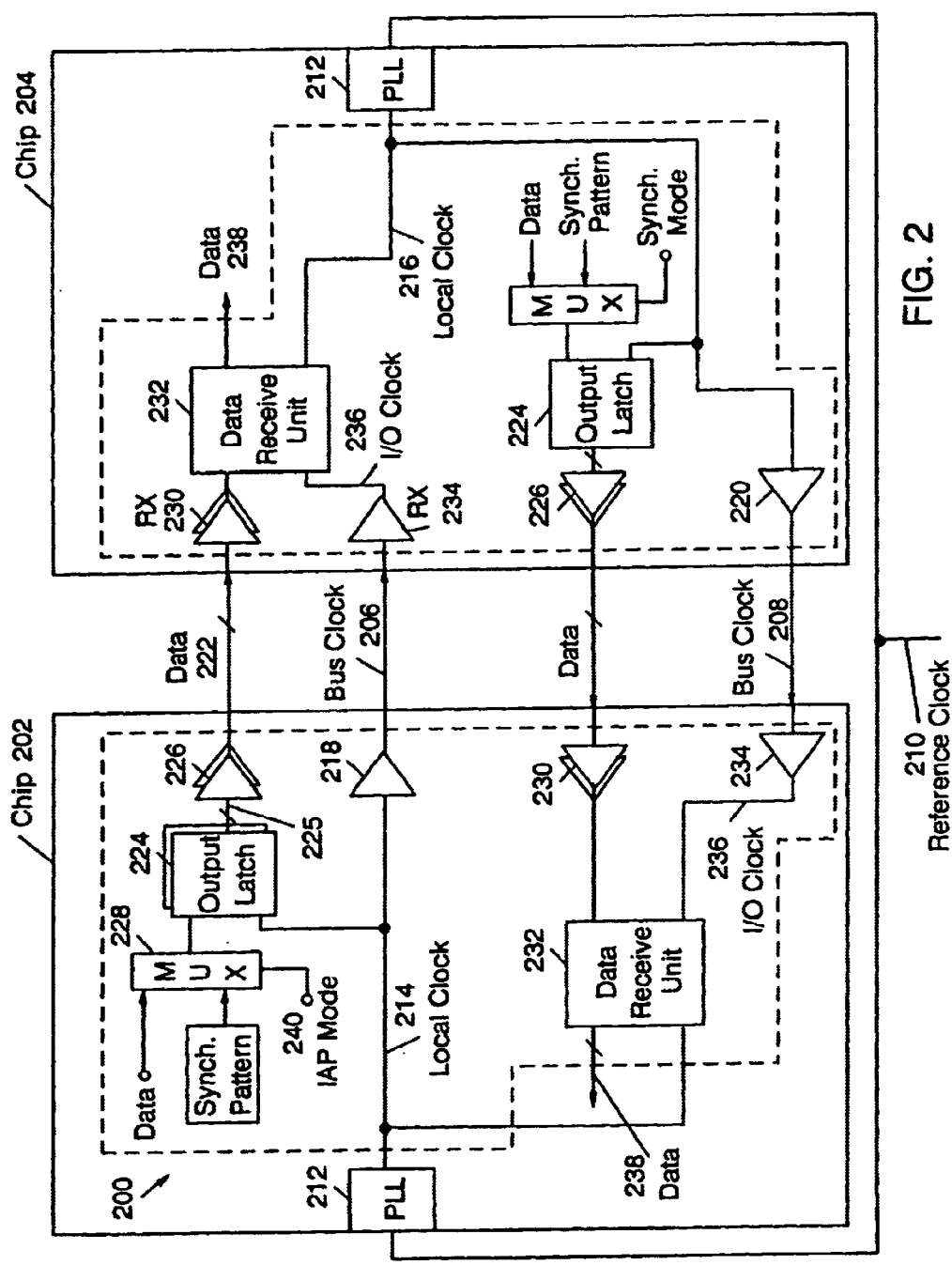
FIG. 2 illustrates, in block diagram form, an embodiment of a dynamic wave-pipelined interface in accordance with the present invention.

Referring now to FIG. 2 illustrating a wave-pipelined interface 200 in accordance with the present invention. Interface 200 is incorporated in each of chip 202 and chip 204 which communicate data with each other via a respective interface 200. In an embodiment of the present invention, chips 202 and 204 may, for example, correspond to CPU 110 and RAM 114 in data processor 113. Data is transferred between chips 202 and 204 at a rate determined by a bus clock, such as, bus clocks 206 and 208. Bus clocks 206 and 208 are nominally the same frequency, and are derived from reference clock 210 provided to a PLL, PLL 212 in each of chips 202 and 204. In an embodiment of the present invention, reference clock 210 may be a system clock. Each of PLL 212 outputs a local clock, local clock 214 in chip 202 and local clock 216 in chip 204 which is locked in phase to reference clock 210, and may be a preselected integer, M, multiple of the period of reference clock 210. Local clock 214 is buffered by driver 218 to provide bus clock 206 output from chip 202. Similarly, local clock 216 is buffered by driver 220 to provide bus clock 208 output from chip 204.

The bus clock is provided along with the data signals communicated from the chip. Data 222 from chip 202 is latched into output latch 224 and driven and buffered by driver 226. The data is latched on a preselected edge of local clock 214. The data is received via multiplexer (MUX) 228. MUX 228 also receives a predetermined synchronization pattern in conjunction with an initialization alignment procedure (IAP). These will be further described below.

Data 222 is buffered by receiver (RX) 230 and provided to an data receive unit 232. Bus clock 206, sent along with data 222, is buffered by RX 234, the output of which forms I/O clock 236, also provided to data receive unit 232. Data from chip 204 being sent to chip 202, along with bus clock 208, is similarly received by interface 200 in chip 202, and it would be understood that the description of data receive unit 232 to follow applies equally well in the receipt of data by chip 202 from chip 204.

Figure 3:
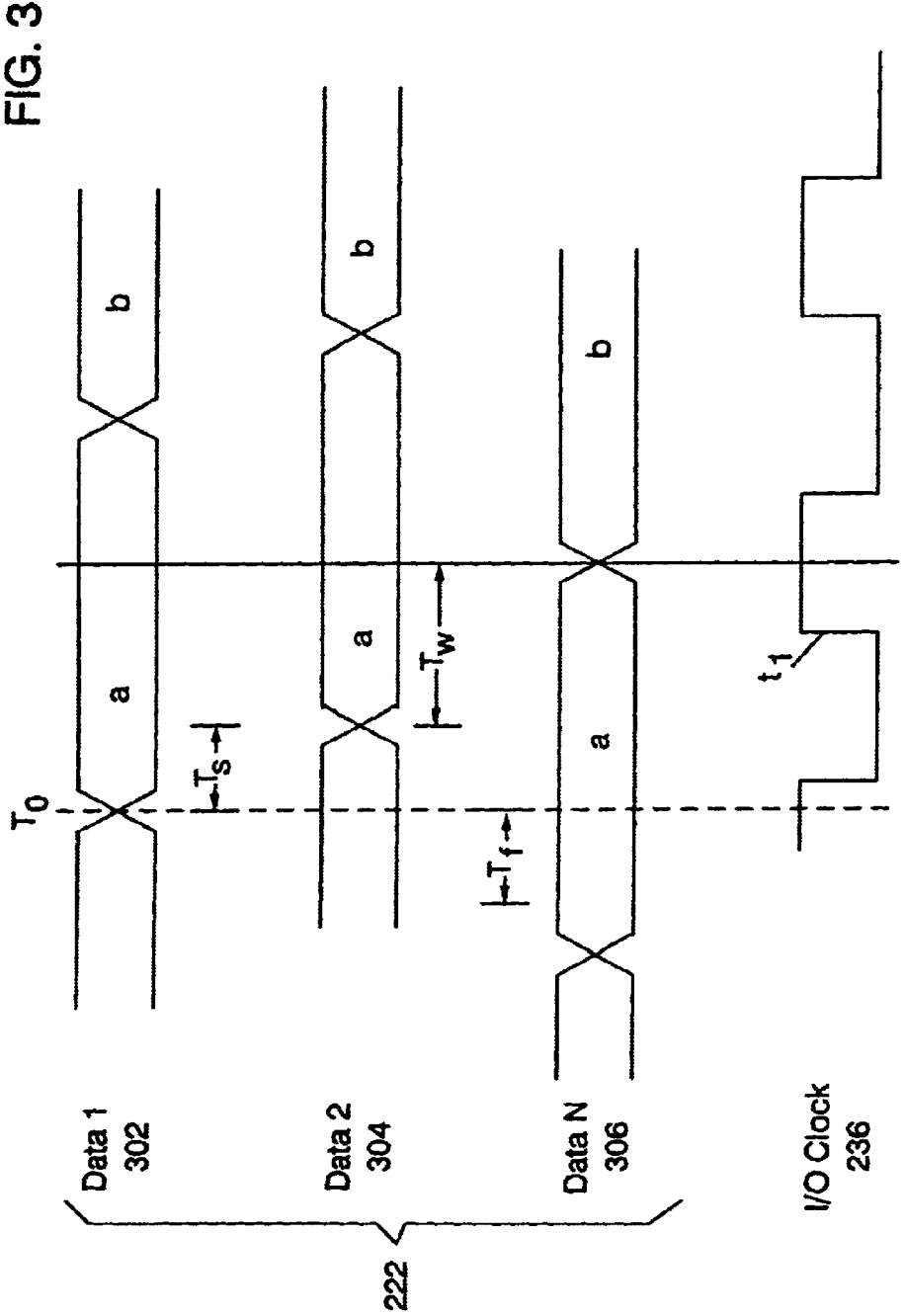
FIG. 3 schematically illustrates an input timing diagram for the interface of FIG. 2.

Refer now to FIG. 3 in which is schematically illustrated a timing diagram for data 222 arriving at an input to chip 204. Although the timing will be described with respect to data 222, interface 200 is bidirectional, and it would be understood that a similar diagram would equally apply for data being transmitted from chip 204 to chip 202. A first data signal, data 302 arrives after a nominal latency arising from the finite transit time on the path between chips 202 and 204. Data 302 is illustrated in FIG. 3 arriving at a fiducial time, $T_0$. A second data signal, data 304 has a latency that is longer than the latency of data signal 302, and is delayed relative to the fiducial time by an amount $T_s$ which will be taken to be a maximum delay from among a plurality of delayed data signals on data bus 222. Similarly, a third data signal, data 306, has a shorter latency than the nominal and arrives earlier than data 302. Data 306 is illustrated as having an arrival time which precedes the fiducial, $T_0$ by $T_f$. For the purpose of describing the operation of data receive unit 232 below, $T_f$ will be taken to represent the earliest arrival time from among a plurality of early data signals on data bus 222. The difference in arrival times of the data on data bus 222 will be referred to as data skew. Data skew may arise from several sources, including manufacturing tolerances, design limitations, such as, variations in line lengths, and time dependent effects, for example, data dependent jitter (intersymbol interference), clock jitter and noise. (In FIG. 3, fiducials have been illustrated with respect to the centers of transitions, for ease of illustration in the schematic timing diagrams. It would be understood by an artisan of ordinary skill that valid transitions may be specified with other predetermined percentages of steady state values.)

Data is latched into the receiving device, such as chip 204, on an edge of I/O clock 236. In the absence of data skew, data may be captured within a data valid window with a width of the period of I/O clock 236. Data skew reduces the width of the data valid window, $T_w$, by the sum of $T_f$ and $T_s$.

Figure 4:
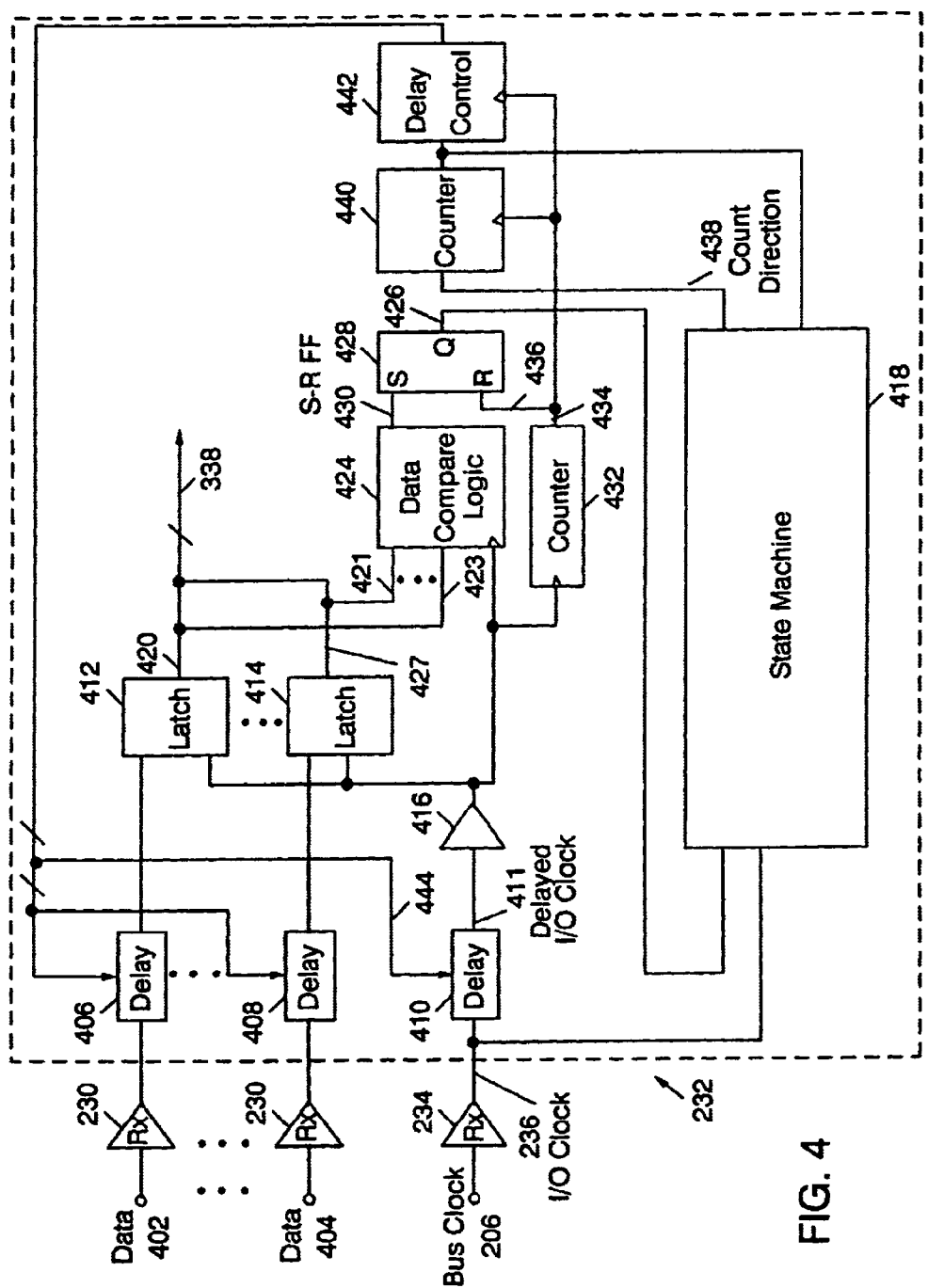
FIG. 4 illustrates, in block diagram form, a data receive unit in accordance with an embodiment of the present invention.

In order to restore the width of the data valid window, interface 200 in accordance with the present invention inputs a plurality of data signals to data receive unit 232, illustrated in FIG. 4. Data is buffered by a receiver 230 and coupled to a programmable delay line, one of delay lines 406 through 408. Programmable delay lines 406 through 408 provide a preselected amount of delay in the corresponding data signal input to the delay line. The delay line receiving the latest arriving data signal, corresponding to data 304 in FIG. 3, is programmed for zero delay. (It would be understood that any circuit has a minimum propagation time. Zero delay would be further understood to be relative to any such minimum propagation time.) Thus, if for example, in FIG. 4, data 402 corresponds to data 304 of FIG. 3, delay line 408 is programmed for zero delay. Delay lines receiving the other data signals are programmed for increasing amounts of delay wherein the delay line receiving the data signal having the earliest arrival, corresponding to data 306 in FIG. 3, is programmed for the longest delay. Thus, if for example, in FIG. 4, data 404 corresponds to the earliest arriving data signal, then delay line 408 is programmed for a longest delay value. In this way, all of the data signals input to chip 204, data 402 through data 404 are deskewed to the latest arriving data signal. Although, the embodiment of the present invention illustrated in FIG. 4 has been shown, and described, in conjunction with individual data signals, it would be understood that the principles of the present invention may be applied to groups of data signals, such as a data byte, or other such groupings of data signals. Such an alternative embodiment would be within the spirit and scope of the present invention.

Delay lines 406 through 408 are programmed to have their preselected delay values via an initialization alignment procedure (IAP). The IAP may be performed on power up or reset of data processing system 100 incorporating dynamic wave pipeline interface 200. In an embodiment of the present invention, IAP may be controlled by a signal from CPU 110 in FIG. 1. In the IAP, a predetermined synchronization (sync) pattern is sent across data bus 222 by asserting IAP mode select 240, whereby MUX 228 outputs the predetermined sync pattern. The sync pattern is sent on all data signals constituting data bus 222.

The sync pattern is captured into latches 412 through 414 which receive the output of delay lines 406 through 408. Data input into latches 412 through 414 are latched on an edge of I/O clock 236 which is derived via buffer 234 from bus clock 206. I/O clock 236 is delayed in delay line 410 in data receive unit 232. The delayed I/O clock is repowered in buffer 416 and provided to latches 412 through 414.

The control of delay line 410, as well as delay lines 406 through 408 is via state machine 418. During the IAP, state machine 418 adjusts the programmable delays in each of delay lines 406 through 408 and 410 in response to capture of the sync pattern in latches 412 through 414.

Outputs 420–422 are coupled to corresponding inputs of data compare logic 424. A suitable sync pattern permits unambiguous resolution of synchronous data capture in the absence of any data skew. One such pattern constitutes the data value sequence "100010001000". This sequence is periodic and has a periodicity of four I/O clock periods, and is used in conjunction with an elastic interface, having an elasticity of four-clock periods. An elastic interface is the subject of the co-pending, commonly-assigned U.S. Patent Application entitled "An Elastic Interface Apparatus and Method Therefor," which has been incorporated herein by reference. Other sync patterns may alternatively be implemented provided any such sync pattern permits unambiguous resolution of synchronous data capture. For example, a sync pattern complementary to the data value sequence above may alternatively be implemented. The selection of the delays in delay lines 406 through 408, and 410 will now be described in conjunction with the operation of state machine 418.

Figure 5A:
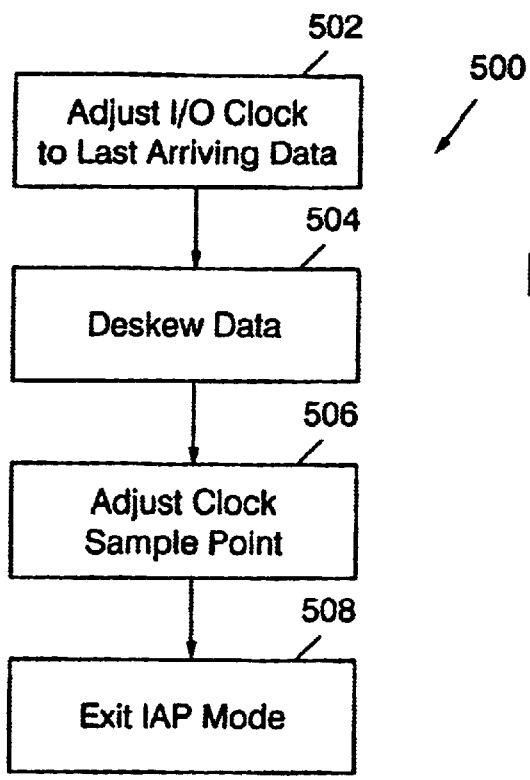
FIG. 5A illustrates, in flowchart form, a methodology in accordance with an embodiment of the present invention.

Refer now to FIG. 5A illustrating methodology 500 for selecting the delays via state machine 418. In step 502, the I/O clock is adjusted to the last arriving data signal by selecting a suitable delay in delay line 410. Step 502 will be further discussed with FIGS. 5B and 5C. The data signals are deskewed in step 504, which will be further described in conjunction with FIGS. 5D and 5E. In step 506, the I/O clock sample point is adjusted. Step 506 will be further described in conjunction with FIGS. 5F and 5G below.

Figure 5B:
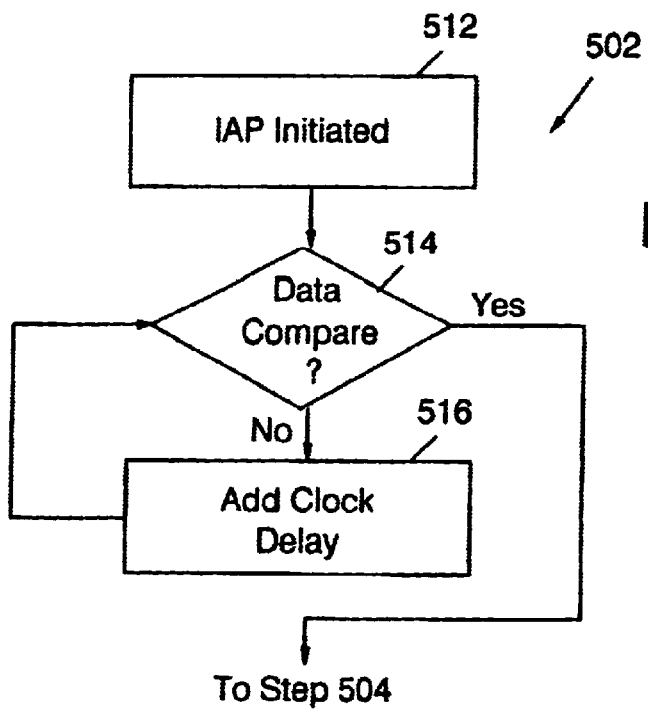
FIG. 5B illustrates, in flowchart form, a method of clock adjustment according to an embodiment of the present invention.

Refer now to FIG. 5B illustrating a flow diagram of I/O clock delay step 502. In step 512, the IAP is initiated with a launch of the sync pattern as previously described. In step 514, state machine 418, in FIG. 4, determines the sync pattern latched into latches 412 through 414 correspond to the same data signal, which for the exemplary sync pattern described above is the value "1". State machine 418 determines if the same data signal has been latched by determining if output 426 of set-reset (S-R) flip-flop 428 has been reset. Output 426 of S-R flip-flop 428 is controlled by data compare logic 424, which detects miscompares and asserts its output 430 in response thereto. In response to the same data signal appearing at each of inputs 421 through 423 of data compare logic 424, output 430 is negated, whereby S-R flip-flop is reset. Data compare logic 424 is gated by delayed I/O clock 411, whereby an output signal is established on output 430 of data compare logic 424 in response to the latching of data into latches 412 through 414. An exemplary embodiment of data compare logic 424, corresponding to a positive logic implementation, may form the logical NAND of the signals on inputs 421 through 423 and the gate derived from delayed clock 411. Alternatively, an exemplary embodiment, corresponding to a negative logic implementation, may form the logical OR of inputs 421 through 423 and a gate derived from the complement of delayed clock 411. Such an embodiment would correspond to the complementary sync pattern discussed above.

Statistical fluctuations in setting the delays in delay lines 406 through 408 and 410 may be reduced by sampling the sync pattern over multiple cycles of delayed I/O clock 411. Delayed I/O clock 411 increments counter 432. Counter 432 asserts output 434 after a predetermined number, K, of delayed I/O clock 411 cycles, and then counter 432 rolls over. Output 434 of counter 432 is coupled to reset input 436 of S-R flip-flop 428, thereby resetting output 426. A next sync pattern/miscompare detect sequence can then be performed. If in any sample a miscompare is detected, S-R flip-flop 428 is set.

Returning to FIG. 5B, if during the sample period, determined by the value of the integer K, all inputs 421 through 423 of data compare logic 424 have the same data signal, step 514 follows the "Yes" path, and method 500 proceeds to step 504. In this case, with delays not yet having been set in delay lines 406 through 408, timing schematically illustrated in FIG. 5C is representative. I/O clock 236 has been delayed through delay line 410 by an amount, $T_d$, wherein edge $t_1$ is within the data valid window represented by time interval, $T_w$.

Initially, the delay time, $T_d$, may be zero, wherein edge $T_0$ lies outside the data valid window and edge $T_0$ latches the value "1" into one of latches 412 through 414 receiving data 306 and the value "0" into latches receiving data 302 and 304. A miscompare results. Then, output 430 of data compare logic 424 is asserted and the output 426 of S-R flip-flop 428 is set. As a consequence, in step 514 in FIG. 5B, the "No" branch is followed. In step 516, state machine 418 increases the delay through delay line 410.

The delay is increased by state machine 418 sending an "Up" signal on count direction 438 to bidirectional counter 440. Counter 440 increments its count in response to counter 432 asserting output 434 when counter 432 reaches the end of the count determined by the value of the integer, K. The count contained in bidirectional counter 440 is supplied to delay control 442. Delay control 442 decodes the count and supplies a corresponding control signal 444 to delay line 410, whereby delay line 410 increases the delay time, $T_d$ by a predetermined time increment. (A programmable delay line 410 which may be used in the present invention is the subject of the co-pending, commonly-owned U.S. Patent Application entitled "Programmable Delay Locked Loop" incorporated herein by reference.) I/O clock delay step 502 then returns to step 514.

If, in step 514, the incremented value of $T_d$ is sufficient to place edge $t_1$ into the data valid window then, step 514 follows the "Yes" branch as described above. Otherwise, the delay through delay line 410 is incremented again in step 516 and I/O clock delay step 502 loops through steps 514 and 516 until edge $t_1$ falls within the data valid window. State machine 418 then, proceeds to step 504, in which the data is deskewed.

Figure 5D:
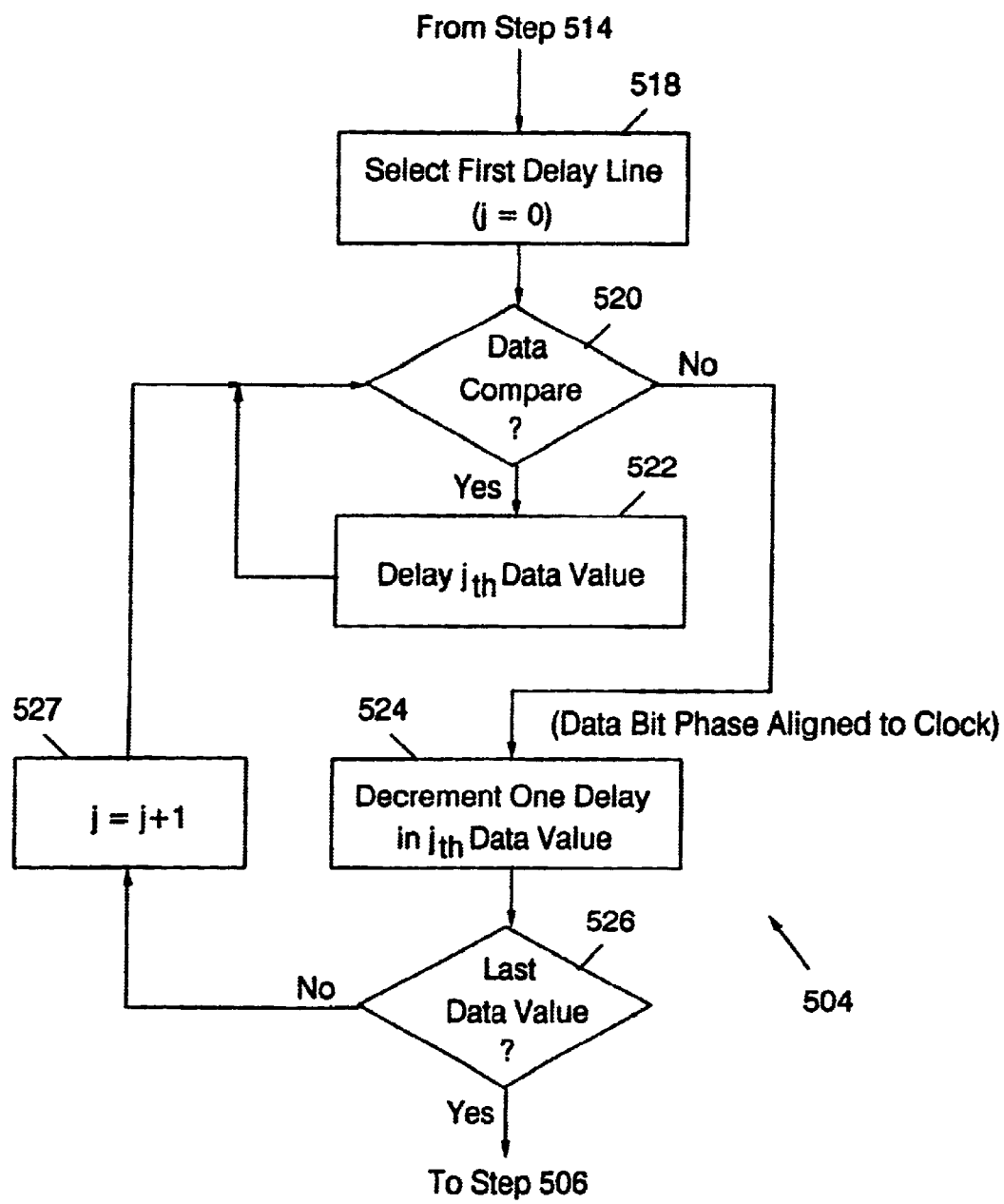
FIG. 5D illustrates, in flowchart form, a method of data deskewing in accordance with an embodiment of the present invention.
Figure 5E:
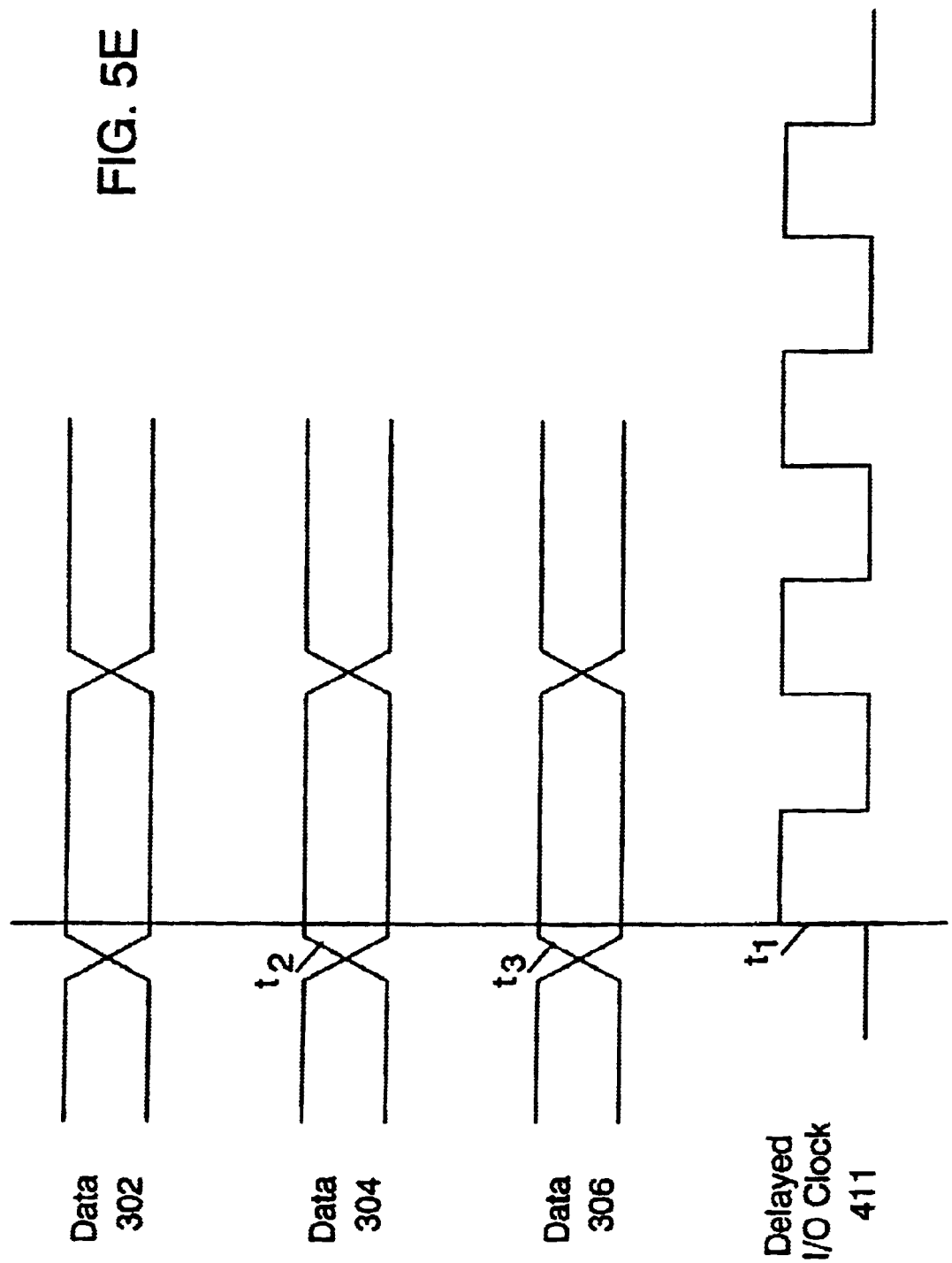
FIG. 5E schematically illustrates a timing diagram corresponding to the method of FIG. 5D.

Data deskew step 504 is described in detail in FIG. 5D. In step 504, the plurality of delay lines 406 through 408 are programmed. In step 518, a first delay line, corresponding to a first data signal, is selected for programming. (This may correspond to an index, j, being initialized to a first value, which may be zero.) In step 520, a data compare is made. The data compare in step 520 is performed in exactly the same fashion as the data compare, step 514, in FIG. 5B and therefore, will not be described again in detail here.

If all of the data signals are in synchronization, then, in step 522, an increment of delay is set in the jth delay line, corresponding to the jth data signal. Note that initially, because of I/O clock adjust step 502, in step 520, the "Yes" branch will be followed. After incrementing the delay, in step 522, a data compare, step 520, is again performed. Data deskew step 504 then loops between steps 520 and 522 until data synchrony is lost, and step 520 takes the "No" branch where, in step 524, the delay in the jth data signal is decremented by one delay increment. In this way, the jth data signal may be phase aligned to the I/O clock.

This may be further understood by referring again to FIG. 5C. Suppose first, by way of example, that in steps 520 and 522 the jth data signal is the latest arriving data signal, data 304. Then, adding the first increment of delay to the corresponding delay line will shift data 304 so that its edge $t_2$ occurs after the edge $t_1$ of delayed I/O clock 411. Then, in step 520, the data compare follows the "No" branch to step 524 where the one delay increment added in step 522 is removed. Thus, for the last arriving data signal, no additional delay is added. This is the desired operation of data deskew step 504 because the last arriving data signal may be the reference for the deskewing of all other data signals.

Similarly, consider now, again by way of example, the operation of steps 520 and 522 for a data signal that is the earliest arriving data signal, data 306 in FIG. 5C. For the earliest arriving data signal, multiple increments of delay are added in its corresponding programmable delay line by repeated iterations through steps 520 and 522, until its edge $t_3$ is shifted in time past edge $t_1$ of delayed I/O clock 411.

Then, just as previously described with respect to data 304, data compare step 520 follows the "No" branch to step 524 where the programmable delay is decremented by one delay increment and edge $t_3$ is aligned to edge $t_1$ of delayed I/O clock 411.

After deskewing the jth data signal, in step 526 data deskew step 504 determines if all data signal delays have been programmed. If not, deskew step 504 advances to the next delay line, in step 527 and returns to step 520. After all delay lines have been adjusted, all data signals are aligned with edge $t_1$ of delayed I/O clock 411, as schematically illustrated in the timing diagram of FIG. 5E, and deskew step 504 proceeds to step 506 of method 500.

Figure 5F:
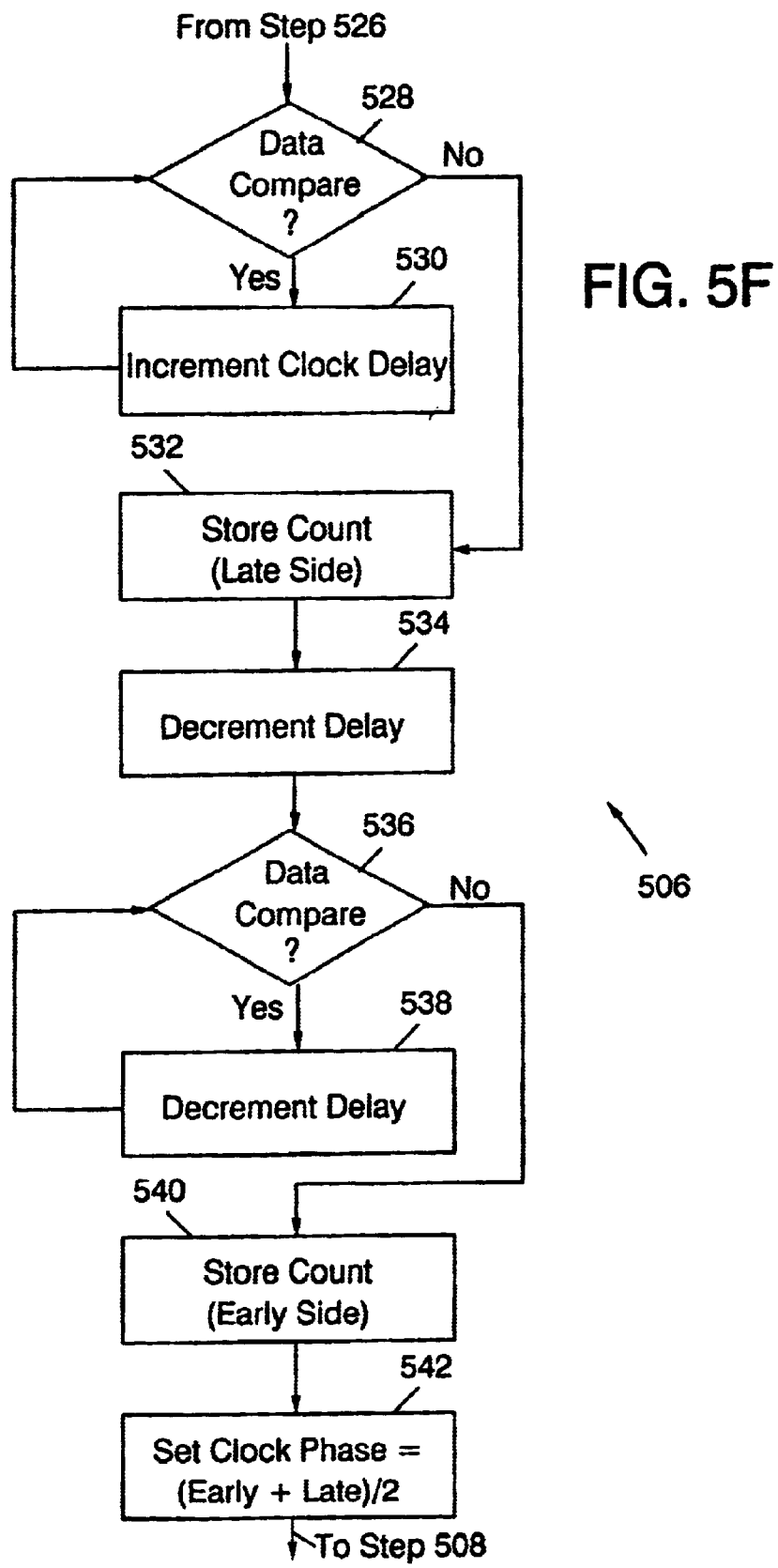
FIG. 5F illustrates, in flowchart form, a method of clock phase adjustment according to an embodiment of the present invention.

In clock sample point adjust step 506, delayed I/O clock 411 edge $t_1$ may be adjusted to a center of the data valid window. Although a clock edge may be centered at launch, it may be skewed at the receiver due to path latency differences, noise, etc. Sample point adjust step 506 deskews the clock signal. Referring to FIG. 5F, in step 528 a data compare is made. Initially, because of data deskewing step 506, data compare step 526 follows its "Yes" branch to step 540 and the time delay programmed in delay line 410 is incremented by one time delay increment, in step 530. Clock sampling point adjust step 506 then returns to step 528 where the data compare is made again. I/O clock adjust step 506 then loops through steps 528 and 530 until a data miscompare, in data compare step 528 results, indicating that delayed clock edge $t_1$ of delayed I/O clock 411, denoted $t_1'$ has crossed a late side, $t_1$ of the data valid window, FIG. 5G. Then, data compare step 528 follows the "No" branch, and, in step 532, the count in counter 440 is stored.

I/O clock sample adjust step 506 then determines the early side of the data valid window. The delay in delay line 410 is decremented by one time delay increment, in step 534. And, in step 536, a data compare is made. Because, in step 534 edge $t_1'$ has been shifted back into the data valid window, data compare 536 follows its "Yes" branch, and the delay programmed in delay line 410 is further decremented by a time delay increment. Clock sample adjust step 506 then loops through steps 536 and 538, until the data compare in data compare step 536 signals a miscompare. This indicates that edge $t_1$ of delayed I/O clock 411, in FIG. 5G, has arrived earlier than an early side, $t_e$ of the data valid window. This transition of delayed I/O clock 411 is denoted by $t_1''$. Data compare step 536 then follows the "No" branch and, in step 540 the early side count in counter 440 is stored.

In step 542, the phase of delayed I/O clock 411 is set to the average of the early side and late side edges of the data valid window. This corresponds, in FIG. 5G, to the solid portion of delayed I/O clock 411 curve, and edge $t_1'''$. Delayed I/O clock sample adjust step 506 then proceeds to step 508, and method 500 exits the IAP mode.

The apparatus and methods represented in the embodiments described herein provide a dynamic wave-pipelined interface. The plurality of data signals arriving at the interface are deskewed relative to each other, compensating for tracking differences between the data signals, differences in the paths between the I/O clock and the data signals, and design tolerances between the data signals, for example, chip wiring, module wiring, and card wiring. Consequently, the data signal region is increased in width. The interface further adjusts the sampling clock to substantially center the sampling point in the center of the data valid window, whereby differences in the paths between the I/O clock and data, module wiring and card wiring may be compensated.

Although the present invention and its advantages have been described in detail, it should be understood that various changes, substitutions and alterations can be made herein without departing from the spirit and scope of the invention as defined by the appended claims.

What is claimed is:

1. An interface apparatus comprising:
   a plurality of delay devices, each device being operable for receiving a corresponding data signal, each delay device having a preselectable delay time, and outputting said data signal after preselected delay time; and
   circuitry coupled to said plurality of delay devices operable for setting each preselectedable delay time, each preselected delay being set in response to an arrival time associated with each data signal, wherein said circuitry operable for setting each preselectable delay comprises:
   data compare logic operable for receiving a predetermined subset of said data signals, an outputting a first predetermined output signal value when said subset of data signals comprises a first predetermined set of values, and outputting a second predetermined output signal value when said subset of data signals has a second predetermined set of values, wherein said subset of data signals assumes one of said first and second predetermined sets of values in response to said associated arrival times; and
   circuitry operable for modifying said preselected delay times in response to said first and second predetermined output signal values.

2. An interface apparatus comprising:
   a plurality of delay devices, each device being operable for receiving a corresponding data signal, each delay device having a preselectable delay time, and outputting said data signal after preselected delay time; and
   circuitry coupled to said plurality of delay devices operable for setting each preselectedable delay time, each preselected delay being set in response to an arrival time associated with each data signal, wherein said circuitry operable for setting each preselectable delay comprises:
   data compare logic operable for receiving a predetermined subset of said data signals, an outputting a first predetermined output signal value when said subset of data signals comprises a first predetermined set of values, an outputting a second predetermined output signal value when said subset of data signals has a second predetermined set of values, wherein said subset of data signals assumes one of said first and second predetermined sets of values in response to said associated arrival times; and
   circuitry operable for modifying said preselected delay times in response to said first and second predetermined output signal values, wherein said first predetermined set of values comprises a set of values wherein each value is the same, and said second predetermined set of values comprises a set of values wherein a first member and second member are different values.

3. The interface apparatus of claim 1 wherein said circuitry operable for modifying said preselected delay times comprises:
   a state machine operable for modifying said preselected delay times in response to said first and second output signal values.

4. The interface apparatus of claim 3 wherein said circuitry operable for modifying said preselected delay times further comprises:
   a counter operable for receiving a direction signal from said state machine, said counter operable for outputting a count signal for determining a number of delay time increments for modifying said preselected delay times, wherein said delay time increment has a predetermined value.

5. The interface apparatus of claim 4 wherein said circuitry operable for modifying said preselected delay times further comprises delay control circuitry operable for receiving said count signal, and outputting a control signal to each of said plurality of delay devices, wherein said control signal is operable for modifying said preselected delay times.

6. An interface apparatus comprising:
   a plurality of delay devices, each device being operable for receiving a corresponding data signal, each delay device having a preselectable delay time, and outputting said data signal after preselected delay time; and
   circuitry coupled to said plurality of delay devices operable for setting each preselectedable delay time, each preselected delay being set in response to an arrival time associated with each data signal, wherein said circuitry operable for setting each preselectable delay comprises:
   data compare logic operable for receiving a predetermined subset of said data signals, an outputting a first predetermined output signal value when said subset of data signals comprises a first predetermined set of values, an outputting a second predetermined output signal value when said subset of data signals has a second predetermined set of values, wherein said circuitry for modifying said preselected delay times in response to said first and second predetermined signals comprises:
   a storage device having an input coupled to said compare logic, the logic state of said storage device being operable for setting in response to said first predetermined signal and resetting in response to said second predetermined signal;
   a counter coupled to said storage device operable for resetting said storage device after an elapse of a predetermined count; and
   circuitry operable for receiving said logic state of said storage device and modifying said preselected delay times in response to said logic state.

7. A data processing system including an interface comprising:
   a central processing unit (CPU);
   a receiving device coupled to said CPU operable for receiving at least one data signal from said CPU, said receiving device including a data receive unit comprising:
   a plurality of delay devices, each device being operable for receiving a corresponding data signal, each delay device having a preselectable delay time, and outputting said data signal after said preselected delay time; and
   circuitry coupled to said plurality of delay devices operable for setting each preselectable delay time, each preselected delay time being set in response to an arrival time associated with each data signal, wherein said circuitry operable for setting each preselectable delay time comprises:

data compare logic operable for receiving a predetermined subset of said data signals, and outputting a first predetermined output signal value when said subset of data signals comprises a first predetermined set of values, and outputting a second predetermined output signal value when said subset of data signals has a second predetermined set of values, wherein said subset of data signals assumes one of said first and second predetermined sets of values in response to said associated arrival times; and circuitry operable for modifying said preselected delay times in response to said first and second predetermined output signal values.

8. The data processing system of claim 7, wherein each preselectable delay time is selected in response to an initialization signal from said CPU.

9. The data processing system of claim 7 said circuitry operable for modifying said preselected delay times comprises:

a state machine operable for modifying said preselected delay times in response to said first and second output signal values;

a counter operable for receiving a direction signal from said state machine, said counter operable for outputting a count signal for determining a number of delay time increments for modifying said preselected delay times, wherein said delay time increment has a predetermined value; and delay control circuitry operable for receiving said count signal, and outputting a control signal to each of said plurality of delay devices, wherein said control signal is operable for modifying said preselected delay times.

10. The data processing system of claim 7, wherein each preselectable delay time is selected in response to each data signal having a predetermined pattern of data values received from said CPU.

* * * * *